(12) United States Patent
Vandeven et al.

(10) Patent No.: US 9,179,602 B2
(45) Date of Patent: Nov. 10, 2015

(54) STRIPPER PLATE BIAS FORCE ADJUSTMENT MECHANISM

(71) Applicant: DEERE & COMPANY, Moline, IL (US)

(72) Inventors: Michael L Vandeven, Princeton, IA (US); Nathan E Krehibiel, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 229 days.

(21) Appl. No.: 13/889,005

(22) Filed: May 7, 2013

(65) Prior Publication Data

US 2014/0331633 A1 Nov. 13, 2014

(51) Int. Cl.
*A01D 45/02* (2006.01)

(52) U.S. Cl.
CPC .................................. *A01D 45/021* (2013.01)

(58) Field of Classification Search
CPC .................................................... A01D 45/021
USPC ........... 56/62, 64, 76, 79, 80, 90, 119, 99, 59, 56/66, 75, 78, 82, 88, 93, 98
See application file for complete search history.

(56) References Cited

U.S. PATENT DOCUMENTS

| 747,263 | A | | 12/1903 | Streitwieser | |
|---|---|---|---|---|---|
| 3,805,499 | A | * | 4/1974 | Woelffer et al. | 56/202 |
| 3,831,356 | A | | 8/1974 | Maiste et al. | |
| 5,060,464 | A | * | 10/1991 | Caron | 56/62 |
| 5,680,750 | A | * | 10/1997 | Stefl | 56/62 |
| 6,226,969 | B1 | * | 5/2001 | Becker | 56/62 |
| 6,237,312 | B1 | * | 5/2001 | Becker | 56/62 |
| 8,224,534 | B2 | * | 7/2012 | Kowalchuk | 701/50 |
| 2011/0173942 | A1 | * | 7/2011 | Kowalchuk | 56/62 |

FOREIGN PATENT DOCUMENTS

| DE | 10012088 A1 | 9/2001 |
|---|---|---|
| EP | 2335471 A1 | 6/2011 |

OTHER PUBLICATIONS

European Search Report issued in counterpart application No. 14165609.0, dated Feb. 19, 2015 (5 pages).

* cited by examiner

*Primary Examiner* — Thomas B Will
*Assistant Examiner* — Mai Nguyen

(57) ABSTRACT

A row unit (10) for a cornhead comprises a frame (12), a pair of stalk rolls (14) and a pair of stripper plates (16) forming a stripper gap (20). At least one of the stripper plates (16) is a shiftable stripper plate (16) that is shiftable in a horizontal direction transversely to the longitudinal extent of the stripper gap (20). A spring (32, 32') has a central helical part (34) winding around a pin (40) connected to the shiftable stripper plate (16) and outer end parts (36) abutting a respective one of two members (44, 54) connected to the frame (12) on opposite sides of the pin (40).

3 Claims, 3 Drawing Sheets

STRIPPER PLATE BIAS FORCE ADJUSTMENT MECHANISM

FIELD

This invention relates to corn heads. More particularly, it relates to a cornhead row unit with a laterally movable stripper plate that is biased towards another stripper plate by means of a spring with adjustable force.

BACKGROUND

Cornheads are harvesting heads mounted on the front of agricultural harvesting machines, like combines or forage harvesters. During operation, cornheads pull down adjacent rows of corn plants and snap the ears of corn of the plants. The cornheads comprise a number of row units arranged side by side, each of which having a pair of stalk rolls (or one stalk roll interacting with a rigid wall) for pulling the plants down. Above the stalk rolls, stripper plates are mounted, forming a forwardly extending stripper gap, through which the plant is pulled down by the stalk rolls. The distance between the stripper plates is generally adjustable and selected such that the stalk can pass, while the ears are removed from the stalks by the stripper plates and fed by a conveyor, usually a chain conveyor, to a cross auger feeding the ears to the interior of the harvesting machine.

In the prior art, laterally movable stripper plates biased towards another stripper plate by means of a spring with adjustable force have been described, allowing the stripper gap to automatically adjust to the diameter of the plant stalks:

IT 1 291 063 A shows a cornhead row unit with laterally shiftable stripper plates that are coupled at their outer lateral edges by respective pivot links to vertically extending levers. One lever is provided at the front and one at the rear end of the stripper plates. The levers are, beneath the stripper plates, fixed to a forwardly extending shaft connecting both levers. The shaft rotates around its longitudinal horizontal, forward axis.

The rear lever extends down beneath the shaft and is connected to a horizontal helical spring biasing the lever to the outside. This force is transmitted by the lever and the shaft to the stripper plate, which is thus biased towards the other stripper plate. The position of the lever with respect to the spring can be adjusted by a screw thread in order to adjust the spring force. This arrangement is relatively complex and further has the disadvantage that, due to the geometry of the mechanism, binding of the stripper plates can occur.

DE 100 12 088 A1 shows another cornhead with spring-biased stripper plates. Helical pressure springs extend in the plane of the stripper plates between the laterally shiftable stripper plates and fixing members at the outer edges of the row unit frame. An adjustment of the spring bias is not provided.

What is needed, therefore, is a cornhead row unit with a stripper plate that is spring-biased by a reliable and uncomplex mechanism. It is an object of this invention to provide such a device in the independent claims of the present application. Further advantages are provided by each of the dependent claims.

SUMMARY

A row unit for a cornhead, comprises a frame, a pair of stalk rolls having generally parallel axes and supported on the frame to be rotatable around their respective axis in opposite directions in order to pull down a plant stalk between them and a pair of stripper plates supported on the frame and forming a stripper gap between the stripper plates above the pair of stalk rolls. The stripper gap has a longitudinal extent generally parallel to the axes of the stalk rolls. At least one of the stripper plates is supported to be shiftable in a horizontal direction transversely to the longitudinal extent of the stripper gap. At least one spring has a central helical part and two outer end parts. The central helical part winds around a pin connected to the shiftable stripper plate. Two members are connected to the frame on opposite sides of the pin such that the pin is located between the two members in a direction extending generally parallel to the longitudinal extent of the stripper gap. Each of the outer end parts abuts a respective member.

In a preferred embodiment, the outer end parts of the spring abut a respective member at a position that is adjustable and/or selectable in order to provide a possibility to adjust the spring force to the actual harvesting situation.

Preferably, both stripper plates are supported to be shiftable in a horizontal direction transversely to the longitudinal extent of the stripper gap and biased towards the respective other stripper plate by a corresponding spring.

Further, a first spring can be mounted at a first end of the shiftable stripper plate and a second spring at a second end of the shiftable stripper plate opposite the first end.

In a preferred embodiment, the position of the member with respect to the frame is adjustable in a direction extending horizontally and transversely to the longitudinal extent of the stripper gap. The member can thus comprise a bolt mounted in a slot of a plate connected to the frame, the slot extending generally horizontally and transversely to the longitudinal extent of the stripper gap.

In another embodiment, the member comprises at least two fingers spaced in a direction that extends generally horizontally and transversely to the longitudinal extent of the stripper gap. The outer end parts of the spring can be selectively brought into engagement with one of the two fingers.

DETAILED DESCRIPTION

Figure 1:
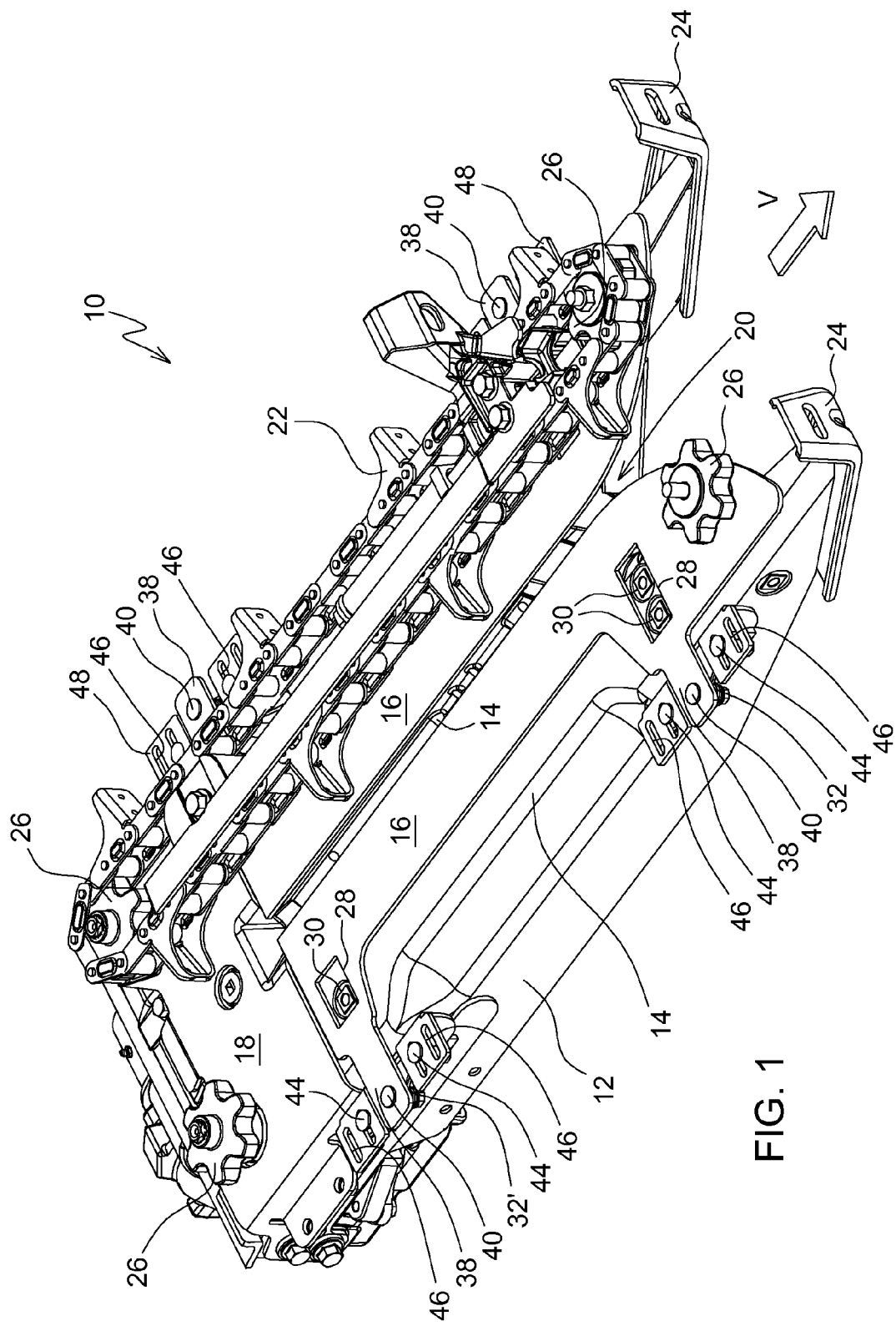
FIG. 1 shows a perspective lateral top view of a row unit for a cornhead with a laterally movable, spring-biased stripper plate.

In FIG. 1, a row unit 10 of a cornhead for a harvesting machine, like a combine or a forage harvester is shown. The row unit 10 comprises a frame 12 that supports a pair of stalk rolls 14 (disposed in parallel to each other), and stripper plates 16 above the pair of stalk rolls 14. The pair of stalk rolls 14 are supported at their rear end to be driven in a rotary motion by a transmission 18 located at the rear end of the row unit 10. One of the pair of stalk rolls 14 is driven in a first direction of rotation that is opposite to a second direction of rotation of the other stalk roll of the pair of stalk rolls 14. The rotation axes of the pair of stalk rolls 14 are generally horizontal and extend in the forward direction when the harvesting machine (not shown) is driving the cornhead with the row unit 10 over a field. However, other embodiments are possible in which the pair of stalk rolls 14 are oriented transversely to the forward direction.

The stripper plates 16 are located above the pair of stalk rolls 14 and form a stripper gap 20 between them. The longitudinal extent of the stripper gap 20 is parallel to the axes of the pair of stalk rolls 14. During operation, corn plants or other stalk plants with fruit are introduced into the stripper gap 20 and their stalks are pulled down between the pair of stalk rolls 14. The ears or fruits are thicker than the stalks and stripped off by the stripper plates 16. A respective chain conveyor 22, also driven by the transmission 18, is located above each stripper plate 16 and feeds the separated ears or fruits towards the rear, from where they are fed by an auger (not shown) of the cornhead to a feederhouse of the harvesting machine. A second chain conveyor is located above the stripper plate 16 shown on the left hand side in FIG. 1, but is omitted in the drawing for the sake of clarity; only the sprockets 26 of this second chain conveyor are shown. In the preceding and following, all direction references, like forward and lateral, are given with respect to the forward direction of the row unit 10 which extends along the arrow marked "V".

The row unit 10 further comprises divider tips (not shown) mounted to brackets 24 at the forward end of the row unit 10.

Both stripper plates 16 are not fixed to the frame 12, but allowed to shift in the lateral direction, i.e. transversely to the longitudinal extent of the stripper gap 20 and horizontally. This is achieved by slots 28 that are rectangular located at the front and rear end of the stripper plates 16 extending transversely to the longitudinal extent of the stripper gap 20 and horizontally. Support rollers 30 supported on the frame 12 extend into the slots 28 in order to support the stripper plate 16 and restrict its shifting range. Additional clamps (not shown) can encase the stripper plate 16 between them and the frame 12 for added stability.

A first spring 32 and a second spring 32' serve to bias each stripper plate 16 laterally towards the center of the stripper gap 20. The first spring 32 is provided at a first (forward) end of the stripper plate 16 and the second spring 32' is provided at a second (rear) end of the stripper plate 16.

The arrangement of the first spring 32 and the second spring 32' and the associated components that connect them to the right side of frame 12 and the stripper plate 16 on the right side of the frame 12 are identically constructed and arranged.

An identical first spring 32 arrangement and second spring 32' arrangement are provided on the left side of the frame 12 but in mirror image form.

In the description below and in FIGS. 2 and 3, only one spring arrangement will be illustrated and described. This spring arrangement is the spring arrangement disposed at the front right side of the frame 12. The other three spring arrangements are constructed the same and operate in the same manner but are omitted for clarity and ease of illustration.

Figure 2:
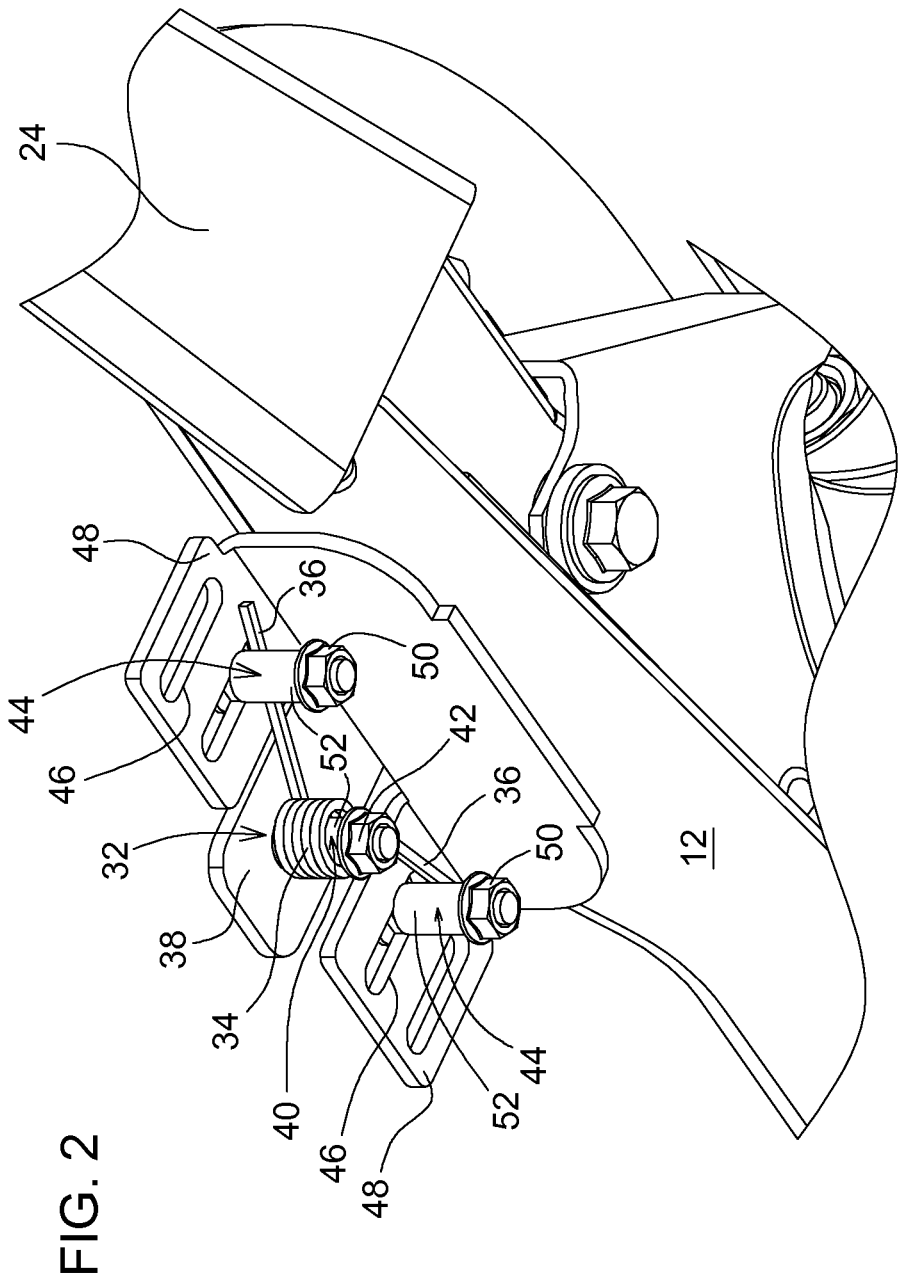
FIG. 2 shows a perspective bottom view of the spring and a first embodiment of its mounting to the row unit frame and to the stripper plate.

As shown in more detail in FIG. 2, the first spring 32 has a central helical part 34 and a pair of outer end parts 36, which are shown as being straight, but could also be slightly curved. A mounting link 38 formed integrally with the stripper plate 16 extends laterally, in the plane of the stripper plate 16, from the stripper plate 16 beyond the lateral end of the frame 12 and supports a pin 40 which is shown as a bolt extending through a corresponding bore or hole in the mounting link 38 and is fixed by a nut 42. The central helical part 34 of the first spring 32 is wound around the pin 40.

Both outer end parts 36 of the first spring 32 abut a respective bolt 44 that extends through a laterally extending slot 46 in a plate 48 which is fixed, e.g. welded or bolted, to the frame 12. The bolts 44 are fixed in the slot 46 at a selectable position by means of nuts 50. Cylindrical bushings 52 on the bolts 44 and on pin 40 protect the first spring 32 from wear.

As shown, the pin 40 is located, viewed in the longitudinal direction of the stripper gap 20, between the bolts 44. By loosening the nuts 50 from the bolts 44, the latter can be moved to any position along the slot 46 and fixed again. Preferably, both bolts 44 on both sides of the pin 40 are moved to the same or similar lateral positions in order to achieve a symmetric bias of the pin 40 and thus of the mounting link 38 and the stripper plate 16 and avoid binding, in particular of the slots 28 with the support rollers 30. The first spring 32 thus adjustably biases the stripper plate 16 in a simple manner without a significant risk of binding.

Figure 3:
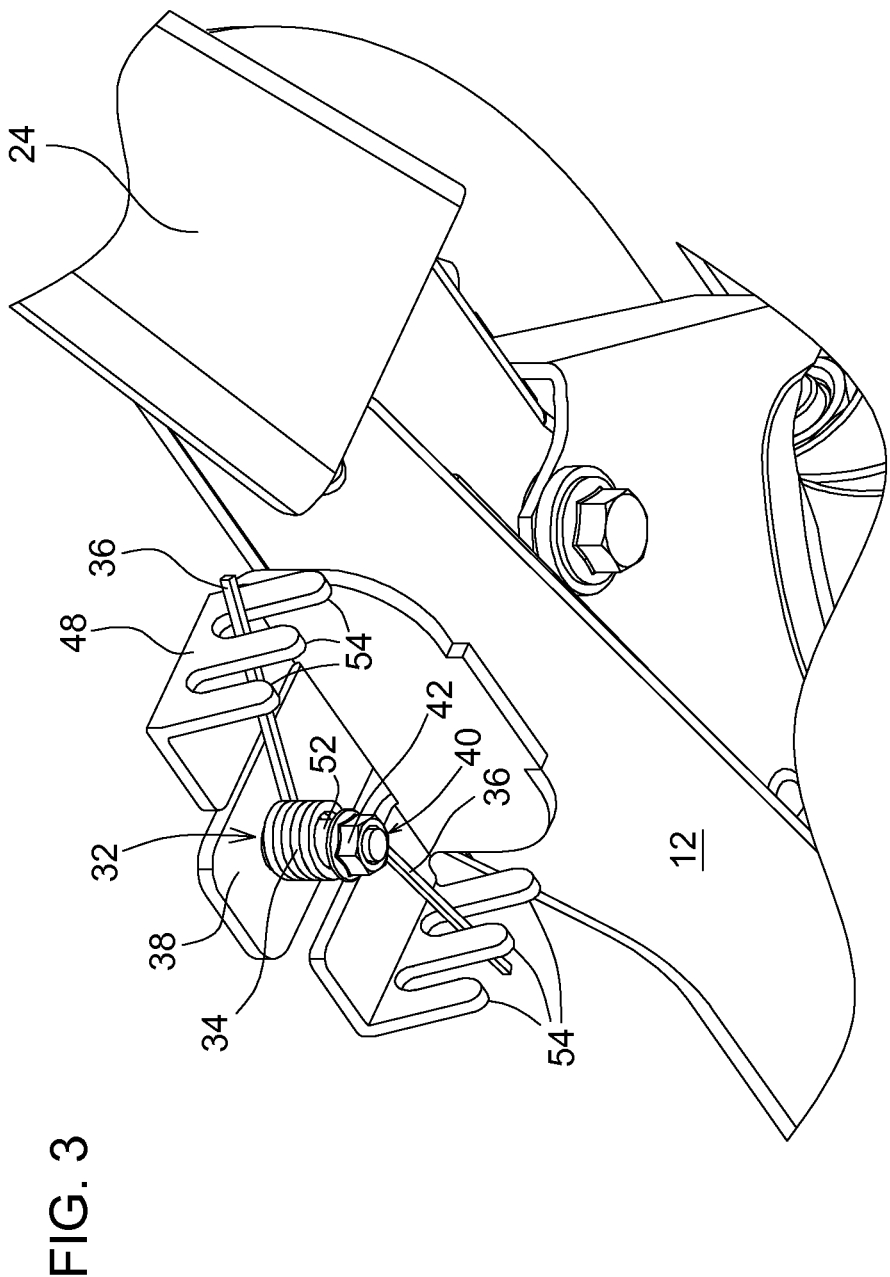
FIG. 3 shows a perspective bottom view of the spring and a second embodiment of its mounting to the row unit frame and to the stripper plate.

In the second embodiment shown in FIG. 3, the bolts 44 are replaced by fingers 54 vertically extending from the plate 48. Vertical slots remain between the fingers 54, allowing to introduce the outer end parts 36 of the first spring 32 in one of three selectable positions in which they abut a respective one of the fingers 54 in order to adjust the bias force.

It should be understood that the particular embodiments shown and discussed herein are not the only ways in which the invention can exist. They are merely a current preferred embodiment of the invention. One skilled in the art of corn head design and manufacture can readily see other variations that would also fall within the scope of the appended claims.

For example, only one stripper plate 16 need be shiftable and the other stripper plate 16 can be fixed to the frame 12.

Further, only one spring arrangement may be provided on the one shiftable stripper plate 16. This one spring arrangement may be provided at any location along the shiftable stripper plate 16. It may be provided at the longitudinal midpoint of the shiftable stripper plate 16.

We claim:

1. A row unit (10) for a cornhead, comprising:
   a frame (12);
   a pair of stalk rolls (14) having axes that are generally parallel and are supported on the frame (12) to be rotatable, wherein each stalk roll of said pair of stalk rolls (14) is rotatable around its respective axis and in a first direction of rotation opposite to a second direction of rotation of another stalk roll of said pair of stalk rolls (14) in order to pull down a plant stalk between the pair of stalk rolls (14);
   a pair of stripper plates (16) supported on the frame (12) and forming a stripper gap (20) between the pair of stripper plates (16) and above said pair of stalk rolls (14), wherein the stripper gap (20) has a longitudinal extent that is generally parallel to the axes of said pair of stalk rolls (14), wherein at least one of said pair of stripper plates (16) is a shiftable stripper plate (16), wherein said shiftable stripper plate (16) is supported to be shiftable in a horizontal direction transversely to the longitudinal extent of the stripper gap (20);
   at least one spring (32, 32') having a central helical part (34) and a pair of outer end parts (36), the central helical part (34) winding around a pin (40) connected to said shiftable stripper plate (16);
   and two members connected to the frame (12) on opposite sides of the pin (40) such that the pin (40) is located between the two members in a direction extending essentially parallel to the longitudinal extent of the stripper gap (20), wherein each of the pair of outer end parts (36) of the at least one spring (32, 32') abuts a respective member, wherein the pair of outer end parts (36) of the at least one spring (32, 32') abut a respective member at a position which is at least one of adjustable and selectable, and wherein the position of each member with respect to the frame (12) is adjustable in a direction extending generally horizontally and transversely to the longitudinal extent of the stripper gap (20).

2. The row unit according to claim 1, wherein each member comprises a bolt (44) mounted in a slot (46) of a plate (48) connected to the frame (12), the slot (46) extending generally horizontally and transversely to the longitudinal extent of the stripper gap (20).

3. The row unit (10) according to claim 1, wherein each said respective member comprises at least two fingers (54) spaced in a direction extending generally horizontally and transversely to the longitudinal extent of the stripper gap (20) and wherein the pair of outer end parts (36) of the at least one spring (32, 32') can be selectively brought into engagement with one of the at least two fingers (54).

\* \* \* \* \*